June 16, 1959   D. E. LUPFER   2,890,707
PNEUMATIC TELEMETERING APPARATUS
Filed Sept. 26, 1955   3 Sheets-Sheet 1

INVENTOR.
D. E. LUPFER
BY
Hudson & Young
ATTORNEYS

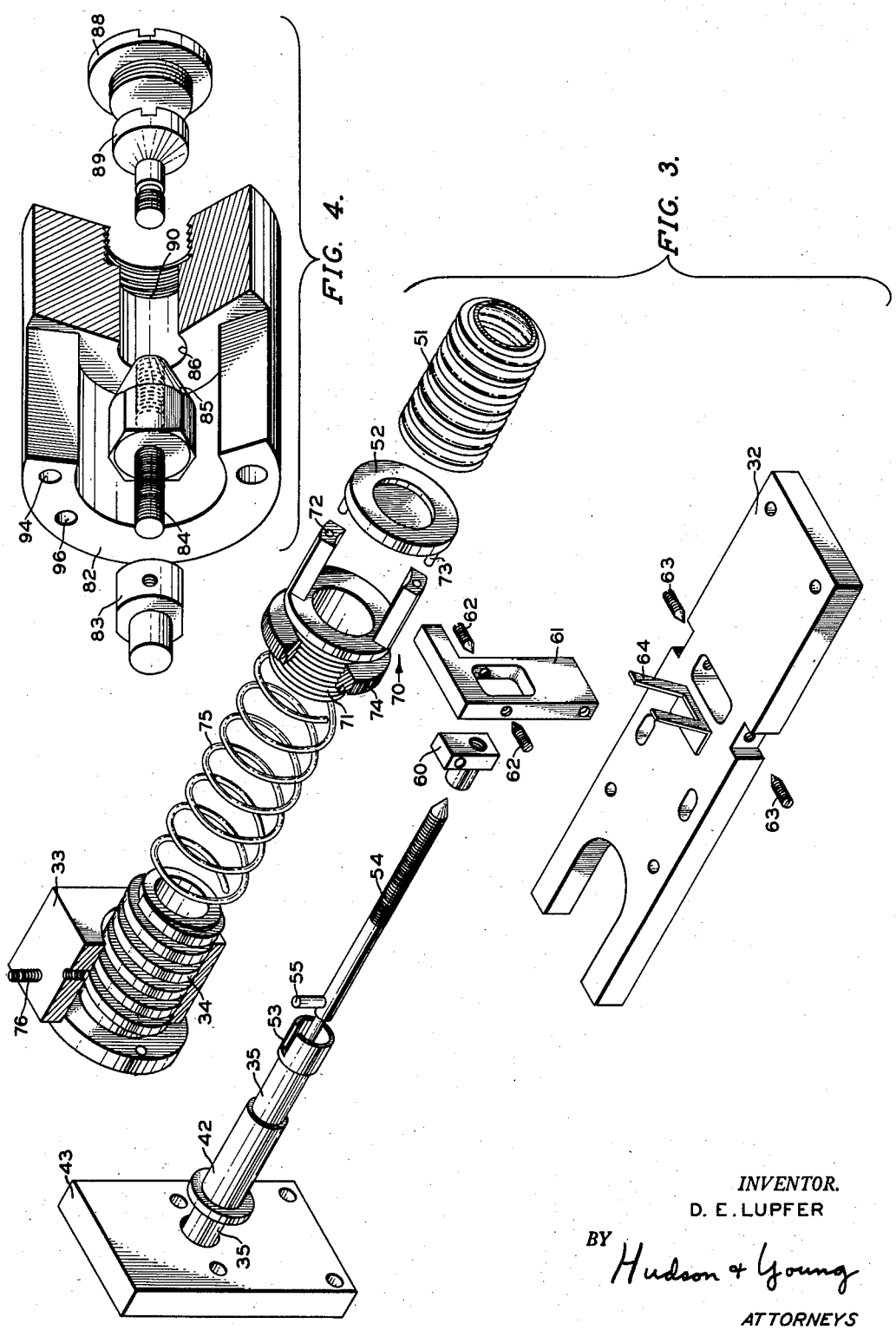

June 16, 1959     D. E. LUPFER     2,890,707
PNEUMATIC TELEMETERING APPARATUS
Filed Sept. 26, 1955     3 Sheets-Sheet 3
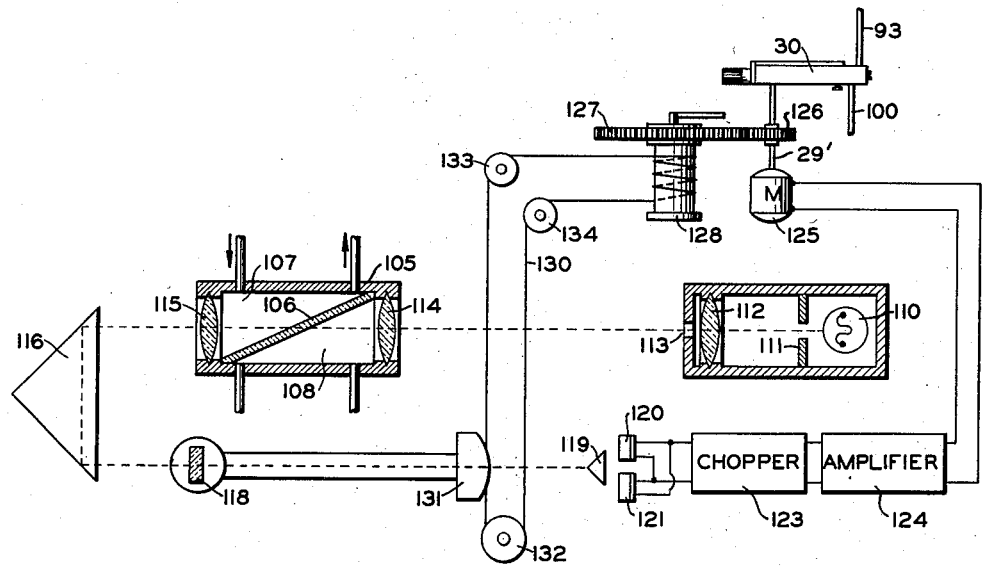
FIG. 5.
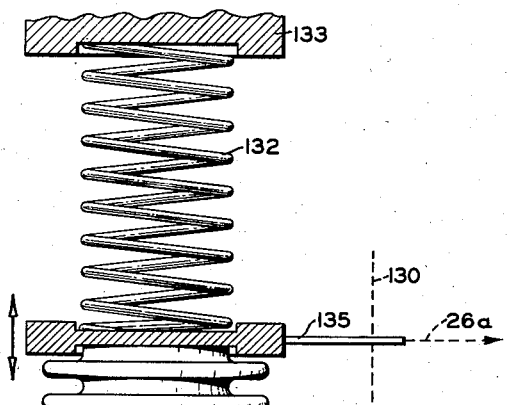
FIG. 6.
INVENTOR.
D. E. LUPFER
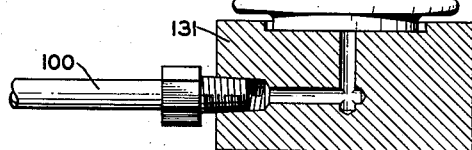
ATTORNEYS

United States Patent Office 2,890,707
Patented June 16, 1959

2,890,707

PNEUMATIC TELEMETERING APPARATUS

Dale E. Lupfer, Bartlesville, Okla., assignor to Phillips Petroleum Company, a corporation of Delaware Application September 26, 1955, Serial No. 536,720

7 Claims. (Cl. 137—86)

This invention relates to apparatus to convert an electrical signal or a mechanical displacement into a corresponding pneumatic pressure. In another aspect it relates to analytical instruments incorporating pneumatic servomechanism.

A number of analytical instruments have recently been developed for the analysis of sample streams and the control of process variables in response thereto. Such instruments include differential refractometers, infrared and ultraviolet spectrometers and color monitors, for example. These instruments generally are of the null balance type and commonly employ a reversible servo motor to maintain a balanced condition in the instrument. The shaft rotation of the motor to restore the balance is a function of the deviation of the composition of the sample stream from a predetermined reference value. This shaft rotation can be converted into a corresponding electrical signal for telemetering and control purposes by the use of a potentiometer. However, for many industrial operations it is desirable to provide a corresponding pneumatic pressure to operate control valves and the like. While instruments are available commercially to convert electrical signals into pneumatic pressures, these instruments are rather complicated and expensive.

In accordance with the present invention there is provided a relatively simple apparatus which is capable of converting mechanical displacements directly into corresponding pneumatic pressures. This instrument comprises a pivoted flapper which regulates the pressure in a relay bellows. The relay bellows controls a valve assembly which connects the output air line either to an input supply of air or to the atmosphere. The bleed nozzle controlled by the flapper is connected to the air supply through an orifice. The position of the flapper relative to the bleed nozzle is adjusted by a screw which is threaded through the flapper and rotated in response to the mechanical displacement to be telemetered. A feedback bellows is employed to resist displacement of the flapper in response to an input rotation. The interior of this bellows communicates with the regulated output air pressure. The balance force exerted by the feedback bellows is adjusted by a compression spring which is readily adjusted by novel means.

Accordingly, it is an object of this invention to provide simple, compact apparatus which is capable of converting a mechanical displacement into a corresponding pneumatic pressure.

Another object is to provide apparatus which provides a regulated output pneumatic pressure that varies linearly with respect to mechanical displacement.

Another object is to provide novel apparatus to vary the effective force exerted by a compression spring.

A further object is to provide analytical instruments incorporating pneumatic feedback servomechanism.

Other objects, advantages and features of the invention should become apparent from the following detailed description taken in conjunction with the accompanying drawing in which:

Figure 3 is a perspective view illustrating construction details of the apparatus of Figure 2;

Figure 4 is a perspective view illustrating additional construction details of the apparatus of Figure 2;

Figure 5 is a schematic representation of a differential refractometer incorporating the transducing apparatus of this invention; and Figure 6 illustrates a modification of the instruments of Figures 1 and 5.

Figure 1:
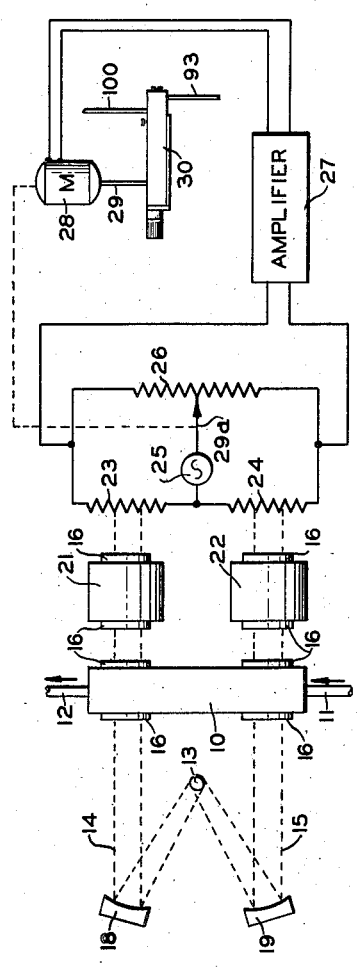
Figure 1 is a schematic representation of a spectrometer having the transducing apparatus of the present invention incorporated therein.

Referring now to the drawing in detail, and to Figure 1 in particular, there is shown an optical analyzer having a sample cell 10 through which a stream to be analyzed is directed by an inlet conduit 11 and an outlet conduit 12. A source of infrared or other suitable radiation 13 is positioned adjacent cell 10. First and second beams of radiation 14 and 15 are directed through transparent windows 16 in cell 10 by respective concave reflectors 18 and 19. Filter cells 21 and 22 are disposed in respective beams 14 and 15. These cells are also provided with transparent windows 16. The resulting beams 14 and 15 impinge upon respective temperature sensitive resistance elements 23 and 24. First terminals of elements 23 and 24 are connected to the first terminal of a voltage source 25. Second terminals of elements 23 and 24 are connected to the respective end terminals of a potentiometer 26. The second end terminals of elements 23 and 24 are also connected to the respective input terminals of a servo amplifier 27. The output of amplifier 27 drives a reversible servomotor 28 which has the drive shaft thereof mechanically connected to the contactor of potentiometer 26. The drive shaft of motor 28 is also connected to the pneumatic transducer 30 of the present invention.

The optical analyzer of Figure 1 is operated in a manner well known to those skilled in the art. Filter cell 21 contains a pure sample of the material to be detected in the sample stream. Cell 22 is employed to balance the beams and preferably contains air or other non-absorbing gas. The difference in intensity of radiation impinging upon elements 23 and 24 is representative of changing concentrations of the material to be detected in the stream circulated through cell 10. Any difference in intensity of the two beams changes the heating effect on elements 23 and 24 so as to unbalance the bridge circuit. This results in a potential difference being applied to the input terminals of amplifier 27. This potential difference drives motor 28 in a direction to adjust potentiometer 26 to eliminate the potential difference applied to amplifier 27. The degree of rotation of motor 28 necessary to restore this balance is a function of a change in concentration of the material being detected in cell 10. This motor rotation can be employed to control a suitable process variable influencing the composition of the sample stream. This control operation can be performed effectively by the pneumatic transducer 30 of the present invention which provides a pneumatic pressure corresponding to the position of the drive shaft of motor 28.

Figure 2:
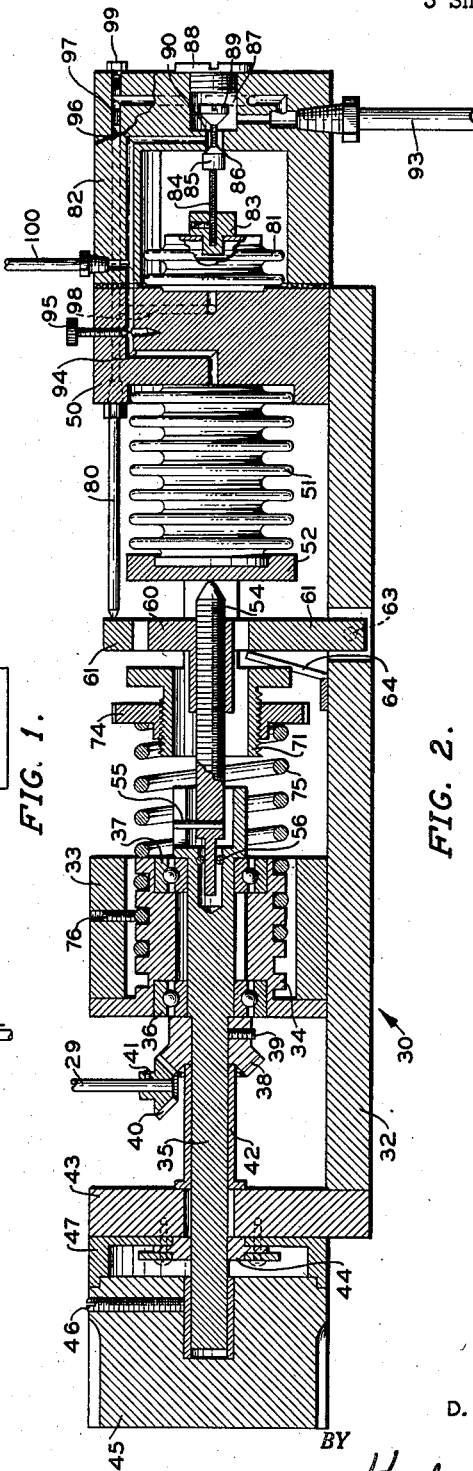
Figure 2 is a detailed sectional view of the transducing apparatus of this invention.

Transducer 30 is illustrated in detail in Figures 2, 3 and 4. The transducer comprises a support plate 32 to which is attached a spring retainer mounting block 33. Block 33 supports a spring retainer sleeve 34. A shaft 35 extends through sleeve 34 and is supported therein by bearing assemblies 36 and 37. A first bevel gear 38 is attached to shaft 35 by a set screw 39. A second bevel gear 40 is attached to drive shaft 29 by a set screw 41. Gear 40 engages gear 38 so as to rotate shaft 35 in response to rotation of motor 28 of Figure 1. The first end of shaft 35 extends through a dial mounting plate 43 which is secured to support plate 32. Shaft 35 also extends through an adapter plate 44 which is attached to mounting plate 43 and supports a dial 45. Dial 45 is secured to shaft 35 by a set screw 46. An annular plate 47 is mounted on plate 43 adjacent dial 45. Plate 47 and dial 45 are calibrated to provide a visual indication of the position of shaft 35.

A base plate 50 is attached to the opposite end of support plate 32. A positioning bellows 51 is secured to base plate 50 and extends therefrom toward mounting block 33. A bellows plate 52 is attached to the second end of bellows 51. The second end of shaft 35 is provided with a slotted sleeve 53, see Figure 3, which receives a flapper positioning screw 54 that has a pin 55 protruding therefrom into the slot of sleeve 53. Pin 55 is free to move longitudinally of shaft 35 and is aligned therein by bearings 56. Screw 54 is threaded at the opposite end through a flapper positioning nut 60 and engages bellows plate 52. Nut 60 is pivotally attached to a flapper 61 by screws 62. Flapper 61 is in turn pivotally attached to support plate 32 by screws 63. Flapper 61 is urged toward bellows plate 52 by a spring 64 which is attached to support plate 32.

A zeroing assembly 70 engages bellows plate 52. This assembly comprises a threaded sleeve 71 having a pair of legs 72 depending therefrom into engagement with bellows plate 52. Plate 52 is provided with pins 73 which enter corresponding openings in leg 72. A spring retaining nut 74 is threaded to sleeve 71 of the assembly. A compression spring 75 engages retaining nut 74 and extends therefrom into engagement with the external threads on spring retainer sleeve 34. Spring 75 is attached to sleeve 34 by a set screw 76.

A nozzle 80 is threaded to base 50 and extends therefrom into close proximity to flapper 61. A relay body 82 is attached to the end of base 50 opposite bellows 51. A relay bellows 81 extends from base 50 into relay body 82. The second end of bellows 81 is attached to a hub 83 which receives a valve stem 84. Valve stem 84 supports a valve head 85 which engages a valve seat 86 formed in relay body 82. A chamber 87 is also formed in relay body 82 and is closed by a plug 88. A second valve head 89 is positioned in chamber 87 and adapted to engage a valve seat 90. Valve head 89 is threaded to valve head 85 so that one of the valve heads moves toward an open position when the other valve head moves toward a closed position.

An air supply conduit 93 is threaded to relay body 82 so as to communicate with chamber 87. Conduit 93 supplies a pressure greater than atmospheric. A passage 94 is formed in body 82 and base 50 to communicate between the interior of bellows 51 and a region between valve heads 85 and 89. The opening of passage 94 can be regulated by a needle valve 95. Nozzle 80 communicates with air supply conduit 93 through a passage 96 formed in base 50 and body 82. An orifice 97 is formed in passage 96. This orifice can be serviced through an opening which is filled by a plug 99.

The operation of the pneumatic transducer of this invention will now be described. Flapper 61 normally is positioned so as to block partially the outlet of nozzle 80. In this manner the pressure within nozzle 80 is less than the pressure in conduit 93 because of the restriction offered by orifice 97. If shaft 29 rotates in a first direction so that rotation of screw 54 tends to move flapper 61 away from nozzle 80, the pressures within passage 96 diminishes. This reduces the pressure in bellows 81 which is in communication with passage 96. A reduction of pressure within bellows 81 results in valve head 85 moving away from valve seat 86 and valve head 89 moving toward valve seat 90. The pressure within passage 94 is thus diminished because this passage then communicates to a greater extent with atmospheric pressure, which is less than the pressure in chamber 87. The pressure in passage 94 is the output pressure which is transmitted through conduit 100. A reduction of pressure in passage 94 reduces the pressure within bellows 51 so that the spring 75 tends to compress the bellows and move flapper 61 toward nozzle 80. At the end of this movement flapper 61 occupies substantially the same position as it occupied before screw 54 was rotated initially. However, the pressure supplied by conduit 100 is less than the original value and bellows 51 is compressed to a greater extent.

If motor shaft 29 should rotate in the opposite direction, flapper 61 is moved initially toward nozzle 80 so as to increase the pressure in passage 96. This increases the pressure in bellows 81 to move valve head 85 toward valve seat 86 and valve head 89 away from valve seat 90. Outlet conduit 100 then communicates to a greater extent with the pressure in chamber 87 so that this output pressure is increased. This increase in pressure is transmitted through bellows 51 to move flapper 61 back to its initial position.

It should thus be apparent that the transducer is a null balance instrument wherein the flapper is always moved back to an initial position following a movement thereof in response to an input shaft rotation. Because flapper 61 moves through an extremely small distance there is no binding between the flapper positioning nut and the flapper. The small initial movement of the flapper is readily accommodated by the flexible mounting assembly. The change in output air pressure is a measure of the rotation of screw 54.

The instrument initially is balanced by adjusting the position of spring retainer nut 74 on sleeve 71. This adjusts the force exerted by the flapper and screw assembly on bellows 51. The span of the instrument can readily be adjusted by changing the compression force exerted by spring 75. This is accomplished by loosening set screw 76 and rotating spring 75 relative to retainer sleeve 34 so that a greater or fewer number of coils of the spring urge the flapper assembly into engagement with bellows 51. The rate of response of the instrument is adjusted by needle valve 95 which can partially close passage 94 to increase the time the changed outlet pressure is transmitted back into bellows 51.

In Figure 5 there is illustrated a second type of analytical instrument to which the transducer of this invention is particularly adapted. The apparatus of Figure 5 is provided to measure changes in refractive index of a sample material. A sample cell 105 is provided with a diagonal transparent plate 106 which divides the cell into chambers 107 and 108. A reference fluid is positioned in chamber 108 and a sample material is circulated through chamber 107. A beam of radiation from a light source 110 is directed through a first aperture 111, a converging lens 112 and a second aperture 113. The emerging light beam passes through a collimating lens 114 which can form the inlet window of chamber 108. The parallel beam passes through chamber 108, plate 106, chamber 107 and emerges from the cell assembly through a converging lens 15. The beam is twice reflected by a glass prism 116 and passes through a rotatable glass plate 118 to impinge upon the apex of a prism 119. If the beam is centered on the apex of prism 119, equal amounts of radiation are directed on adjacent photocells 120 and 121. The outputs of these photocells are connected in opposition to the input terminals of a chopper 123 which provides an output signal of phase representative of the relative amounts of light impinging upon cells 120 and 121. The output signal of chopper 123 is applied to a servo amplifier 124 which drives a reversible motor 125.

If the refractive index of the fluid circulated through chamber 107 changes, the light beam is deviated in a first or second direction depending upon the direction of change of the refractive index. This varies the amount of light received by the two photocells so that motor 125 is rotated in one direction or the other. The drive shaft 29' of motor 125 is connected through gears 126 and 127 to rotate a drum 128. A cord 130 is attached to a pivot arm 131 and extends about supports 132, 133 and 134 and drum 128. Rotation of drum 128 thus moves pivot arm 131 to rotate block 118 which is pivoted at its center point. The direction of rotation of block 118 is such as to restore the light beam to the apex of prism 119. Drive shaft 29' of motor 125 is also connected to the transducer 30 of the present invention to provide an output air pressure in conduit 100 which is representative of the position of shaft 29'.

In Figure 6 of the drawing there is shown a modified form of pneumatic servomechanism which can be employed to balance either of the instruments of Figures 1 and 5. The air pressure in conduit 100 is transmitted to the interior of a bellows 130 which is mounted on a support 131. Bellows 130 normally is urged to a compressed position by a spring 132 which extends between the bellows and a support 133. An arm 135 is attached to bellows 130 so that movement thereof is representative of the pressure within bellows 130. This arm can be connected directly to the contactor of potentiometer 26 in Figure 1 or to cord 130 in Figure 5 so that a pneumatic pressure serves to rebalance the instrument. This arrangement eliminates the need for mechanical connections between the servo motor and the rebalance element. This is advantageous in some operations because a smaller servo motor can be employed. The only force required by such a motor in this particular embodiment is that required to rotate shaft 35. Because of the nearly balanced assembly, this force is extremely small.

While the invention has been described in conjunction with the present preferred embodiments, it should be evident that it is not limited thereto.

What is claimed is:

1. A transducer comprising means adapted to be connected to a source of pneumatic pressure greater than atmospheric pressure; a conduit communicating at one end through a restriction with said means, said conduit being open at the other end; a flapper comprising a support, a first plate pivotally attached to said support at one end so that the second end is free to move toward and away from the open end of said conduit, said first plate having an opening therein, a second plate positioned within said opening, said second plate having a threaded opening therein, and means pivotally attaching said second plate to said first plate; a screw threaded into the opening of said second plate; means to rotate said screw in accordance with a mechanical displacement to be measured; means forming an expansion chamber positioned to urge said first plate away from said conduit with a force representative of the pressure in said chamber; valve means communicating between said means adapted to be connected to a source of pressure, atmospheric pressure and said chamber; and means responsive to the pressure in said conduit to adjust said valve means to regulate the pressure in said chamber, the pressure in said chamber being representative of the amount said screw is rotated.

2. A transducer comprising means adapted to be connected to a source of pneumatic pressure greater than atmospheric pressure; a conduit communicating at one end through a restriction with said means, said conduit being open at the other end; a flapper positioned for movement toward and away from the open end of said conduit; a screw threaded to said flapper so that rotation of said screw so moves said flapper; means to rotate said screw in accordance with a mechanical displacement to be measured; means forming an expansion chamber positioned to urge said flapper away from said conduit with a force representative of the pressure in said chamber; an expansion spring; first means to retain the first end of said spring against said expansion chamber; a support spaced from said expansion chamber; second means to retain the second end of said spring against said support so that said spring urges said expansion chamber to a compressed position; valve means communicating between said means adapted to be connected to a source of pressure, atmospheric pressure and said chamber; and means responsive to the pressure of said conduit to adjust said chamber means to regulate the pressure in said valve, the pressure in said chamber being representative of the amount said screw is rotated.

3. The combination in accordance with claim 2 wherein one of said first and second means comprises a threaded generally cylindrical member having said spring threaded thereon, and means to clamp said spring to said member.

4. The combination in accordance with claim 2 wherein one of said first and second means comprises a threaded member, and a spring retaining nut threaded to said member.

5. A transducer comprising means adapted to be connected to a source of pneumatic pressure greater than atmospheric pressure; a conduit communicating at one end through a restriction with said means, said conduit being open at the other end; a support; a flapper pivotally attached to said support; a screw threaded to said flapper so that rotation of said screw moves said flapper about the pivot point of said flapper toward and away from the open end of said conduit; means to rotate said screw in accordance with a mechanical displacement to be measured; an expansion chamber attached to said support and extending into engagement with said screw to urge said flapper away from said conduit with a force representative of the pressure in said chamber; valve means communicating between said means to be connected to a source of pressure, atmospheric pressure and said chamber; and means responsive to the pressure in said chamber to adjust said valve means to regulate the pressure in said chamber, the pressure in said chamber being representative of the amount said screw is rotated.

6. A transducer to convert a mechanical displacement into a corresponding pneumatic pressure comprising a shaft adapted to be rotated responsive to a mechanical displacement to be measured, a screw, means connecting said screw to said shaft so that said screw is rotated with said shaft but is free to move longitudinally of said shaft, a first bellows engaged by said screw so as to be compressed by rotation of said screw in a first direction, adjustable expansion means exerting a force on said first bellows to compress same, means defining a first chamber adapted to be connected to a source of pneumatic pressure greater than atmospheric, means defining a second chamber, a first valve between said first and second chambers, a second valve between said second chamber and a region of atmospheric pressure, first conduit means communicating between said second chamber and the interior of said first bellows, a support, a flapper threaded to said screw and pivotally attached to said support, a nozzle positioned so that said flapper moves toward and away from said nozzle responsive to rotation of said screw, a second bellows, second conduit means having a restriction therein communicating between said first chamber and said nozzle and the interior of said second bellows, and means responsive to expansion and contraction of said second bellows to open said first valve and close said second valve when said second bellows expands and to open said second valve and close said first valve when said second bellows contracts, the pressure in said first bellows being representative of the mechanical displacement to be measured.

7. The combination in accordance with claim 6 further comprising a calibrated dial connected to said shaft to indicate rotation thereof.

References Cited in the file of this patent

UNITED STATES PATENTS

| | | |
|---|---|---|
| 2,126,533 | Caughey | Aug. 9, 1938 |
| 2,324,514 | Kalin | July 20, 1943 |
| 2,324,515 | Kalin | July 20, 1943 |
| 2,507,606 | McLeod | May 16, 1950 |
| 2,601,867 | Alyea | July 1, 1952 |
| 2,651,468 | Joestling | Sept. 8, 1953 |
| 2,689,390 | Liston | Dec. 28, 1954 |
| 2,714,895 | Rockwell | Aug. 9, 1955 |
| 2,718,597 | Heigl et al. | Sept. 20, 1955 |
| 2,721,942 | Friel et al. | Oct. 25, 1955 |
| 2,731,025 | Neuman | Jan. 17, 1956 |
| 2,731,877 | Clamann | Jan. 24, 1956 |
| 2,782,769 | Best | Feb. 26, 1957 |

UNITED STATES PATENT OFFICE
CERTIFICATE OF CORRECTION

Patent No. 2,890,707                                              June 16, 1959

Dale E. Lupfer

It is hereby certified that error appears in the printed specification of the above numbered patent requiring correction and that the said Letters Patent should read as corrected below.

Column 4, line 59, for "lens 15" read -- lens 115 --; column 6, line 9, for "chamber" read -- valve --; same line 9, for "valve" read -- chamber --.

Signed and sealed this 26th day of April 1960.

(SEAL)
Attest:

KARL H. AXLINE                                                  ROBERT C. WATSON
Attesting Officer                                         Commissioner of Patents